(No Model.) 2 Sheets—Sheet 2.
H. D. HINTERNESCH.
ATTACHMENT FOR BAND AND SCROLL SAWS.
No. 547,260. Patented Oct. 1, 1895.
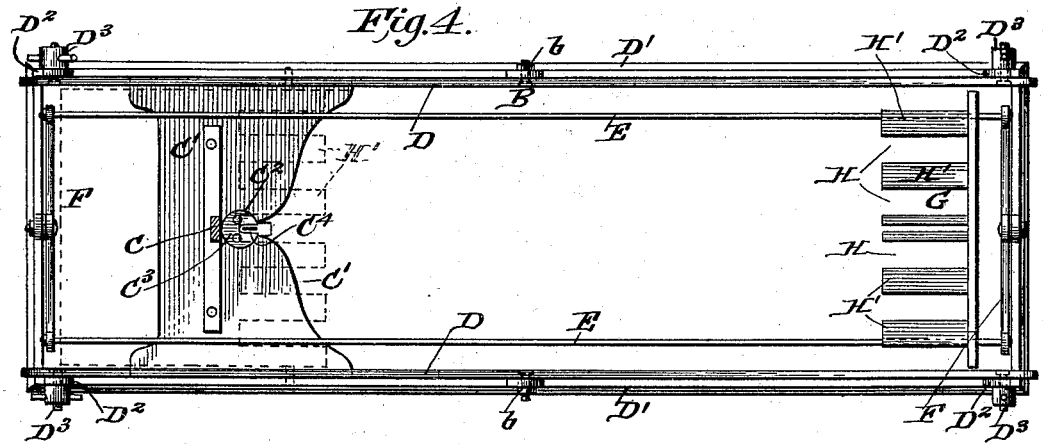
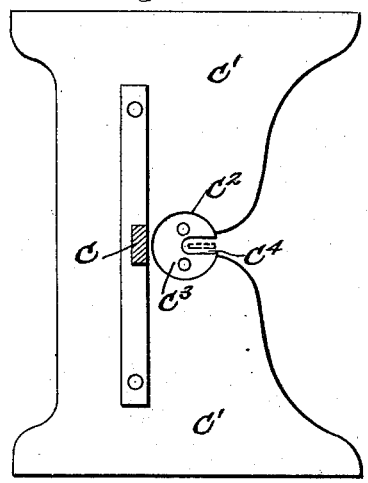
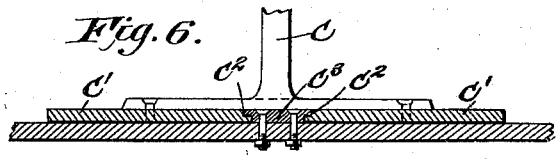
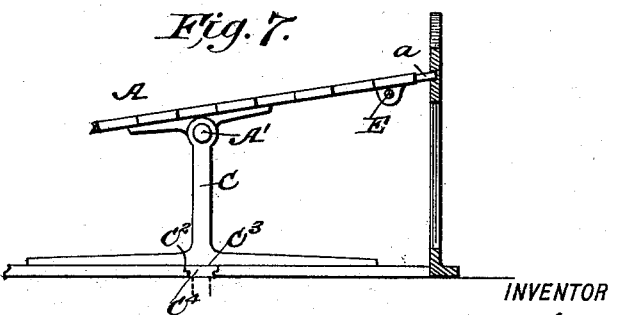
WITNESSES:
M. D. Bloudel
P. B. Turpin
INVENTOR
H. D. Hinternesch.
BY Munn & Co.
ATTORNEYS.

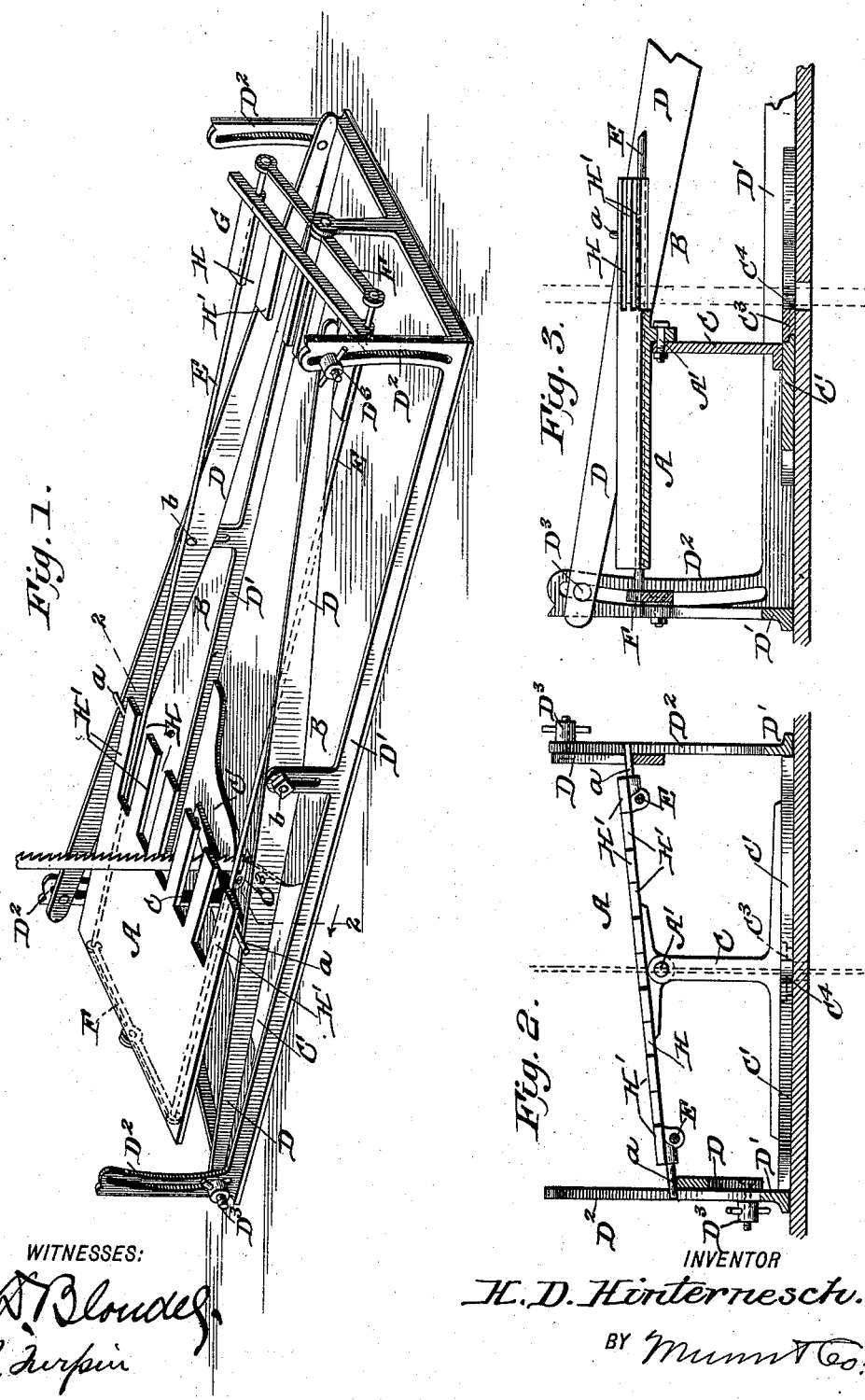

UNITED STATES PATENT OFFICE.

HERMAN D. HINTERNESCH, OF BALTIMORE, MARYLAND, ASSIGNOR OF ONE-HALF TO JOHN C. KNIPP, OF SAME PLACE.

ATTACHMENT FOR BAND AND SCROLL SAWS.

SPECIFICATION forming part of Letters Patent No. 547,260, dated October 1, 1895.

Application filed March 29, 1895. Serial No. 543,740. (No model.)

*To all whom it may concern:*

Be it known that I, HERMAN D. HINTERNESCH, residing at Baltimore, in the State of Maryland, have invented a new and useful Improvement in Attachments for Band and Scroll Saws, of which the following is a specification.

My invention is an improvement in attachments for sawing-machines, and has for an object to provide a simple construction which may be conveniently applied to any ordinary band or scroll saw by which to saw the exact wind or winding shape into hand rails, moldings, &c., for circular or curved stairways or for other purposes where such circular or curved rails may be desired.

The invention has for a further object to so construct the apparatus that it may be conveniently adjusted to saw to any given circle or curve and any degree of pitch or rise, as may be required.

The invention has for a further object to so construct the table and the back support that the piece to be sawed may be carried past the saw.

The invention has for further objects other improvements, and consists in certain novel constructions, combinations, and arrangements of parts as will be hereinafter described, and pointed out in the claims.

In the drawings, Figure 1 is a perspective view of my improved apparatus. Fig. 2 is a cross-section on about line 2 2 of Fig. 1. Fig. 3 is a partial longitudinal section. Fig. 4 is a top plan view. Figs. 5 and 6 are detail views, and Fig. 7 shows a somewhat different construction.

The purpose of my invention is to enable an operator to accurately saw the wind, which it is now customary to give to rails by hand and so facilitate and cheapen the production of such rails. In effecting this I provide an attachment conveniently applicable to ordinary sawing-machines and comprising a transversely tilting or rocking table A and guide devices B, which are movable longitudinally with respect to such table and engage the same in such manner as to control the tilting movements of the table and so set the same and the piece held thereon at the proper angle to the saw to secure the cut thereof necessary to produce the wind, the operation being that as the guide devices are moved longitudinally along the table, the latter will be tilted to different angles properly effecting the wind, as desired.

In the construction shown the table is a flat platform, and this is preferred; but, manifestly, a simple cross-bar sufficiently long to receive the motions of the guide devices might be used instead of such flat platform without departing from some of the broad principles of my invention. At its opposite sides the table has projecting portions $a$, which bear upon the cam-surface presently described, and this table is pivoted a A′ centrally between its sides upon a support C, which has a quadrangular base-plate C′ pivoted vertically in practice upon the table of the sawing-machine, so the table A may be turned on a vertical axis, as will be desired in sawing different curves. The guide devices in the construction shown comprise inclined reversely-disposed cams D supported in a frame D′, which is movable longitudinally with respect to the table A, and this frame D′ fits at its opposite sides along the sides of the quadrangular base-plate C′, so that as the table and its support are swung upon its vertical axis the guide device is correspondingly swung, so that the direction of its longitudinal movement is always parallel lengthwise with the table, thus imparting the transversely tilting motion to the table in conjunction with the vertically-swinging motion. While for some purposes the cams might be fixed, it is preferred to support them adjustably, to which end they are pivoted at $b$ centrally between their ends and have their ends movable along arc-like portions $D^2$ at the ends of the frame D′, where they may be secured in any adjustment by means of set-screws $D^3$ or other suitable fastenings. These cams are arranged at opposite sides of the table, are reversely disposed, and engage under the lateral projections $a$ of the table, so that the movement of said frame longitudinally along the table will tilt the latter first in one and then in the other direction, such operation effecting the proper movement of the work held on said table to saw the wind in the piece. Manifestly, the upper edges of the cams may be formed on straight lines, as shown, for certain work, or for other work the said cam-surfaces may be curved or otherwise formed as the peculiar character of the wind may require. In securing the support C to the table of the sawing-machine it is desirable that the saw be located as nearly as possible to the center of vertical motion of said support, and in securing this result in connection with the pivot I find it desirable to employ the peculiar construction shown, wherein the support C has its base-plate provided within a central circular opening $C^2$, rabbeted, as shown, on its upper side, and to provide a plate $C^3$, rabbeted and fitted to such circular opening $C^2$, the plate $C^3$ being bolted or otherwise rigidly fixed to the bed of the sawing-machine and having in its edge a cut-out portion or recess $C^4$, extending to or nearly to its center, so the saw may be set near to such center, as will be understood from the drawings.

In connection with the tilting table I prefer to provide transversely-tilting timber-rests, carried by the guide device, being arranged usually at the front and rear ends thereof and pivoted in alignment with the pivot of the table A. These rests F carry the ends of the work, and connections E extend between the same and the table, so the rests F will be tilted in correspondence with the movements of the table A, thus relieving in a measure the inconvenience that might result from resting a portion of the piece being sawed upon a tilting table and other portions thereof on non-tilting carriers, as will be understood. The connections E are shown as rods carried through eyes on the under side of the table A and suitably secured to the rests F near the ends of the latter. In sawing the wind upon rails and moldings, it is desirable to saw entirely to the end of the piece, and in order to effect this result and at the same time provide a rest in advance of the saw for the front end of the piece of timber in starting the cut and for the rear end thereof in advance of the back-rest G, I provide the meeting edges of the back-rest and the table with recesses at H and interlapping portions H', whereby the timber may in finishing the cut be moved past the saw, as clearly shown in the drawings.

While for ease of adjustment and firmness in operation it is preferred to arrange the cams at the opposite sides of the table, it should be understood that I do not desire to be limited in the broad features of my invention thereto, as the cam operation might be secured by providing the guide with a groove or slot and the table with a stud projection to enter the same, as indicated in Fig. 7, the opposite walls of the groove or slot forming the reverse cams for operating the table.

In operation, the circular or curved pieces are marked or laid off with a pencil upon the surface of the plank in the ordinary way, and as the saw cuts through the line the guide devices moving with the work operate to tilt the table to automatically give the exact wind desired. When the guide is moved to bring the middle portions of the cams in engagement with the table, the latter will be held level for ordinary sawing.

Having thus described my invention, what I claim, and desire to secure by Letters Patent, is—

1. An apparatus substantially as described comprising a transversely tilting or rocking table and guide devices movable longitudinally along such table and arranged to positively tilt such table in opposite directions, in a direction substantially parallel to the axis of the tilting movement thereof and engaging the same whereby to control its tilting movement, substantially as set forth.

2. An apparatus substantially as described comprising a transversely tilting or rocking table and reversely disposed cams forming guides engaging and movable longitudinally with respect to such table in a direction substantially at right angles to the plane in which the table tilts or rocks whereby to control the tilting thereof, substantially as set forth.

3. An apparatus substantially as described, comprising a transversely tilting or rocking table and opposite inclined reversely disposed cams forming guides by which to positively tilt such table in opposite directions and engaging said table on opposite sides of its center and movable longitudinally along the table, in a direction substantially at right angles to the plane in which the table tilts or rocks substantially as set forth.

4. An apparatus substantially as described, comprising a transversely tilting or rocking table, a vertically pivoted support on which said table is mounted and oppositely inclined cams mounted in a sliding frame, said frame together with the cams being movable longitudinally with respect to the table and having portions engaging the supports thereof, whereby the frame and cams may be maintained at right angles to the tilting line of the table as the latter is swung with its support substantially as and for the purposes set forth.

5. An apparatus substantially as described, comprising a transversely tilting or rocking table, a vertically pivoted support on which said table is pivoted and the guide devices having portions fitted and movable along the opposite edges of such support and also provided with cams engaging the table whereby to control the tilting thereof substantially as and for the purpose set forth.

6. An apparatus substantially as described, comprising a transversely tilting or rocking table, guide devices movable longitudinally with respect to such table and engaging the same whereby to control its tilting movement a transversely tilting rest or rests carried by said guide devices and connections between such tilting rest and the table whereby the said parts may be correspondingly moved, substantially as and for the purposes set forth.

7. An apparatus substantially as described, comprising a transversely tilting table, a support for such table having its base provided with a circular rabbeted opening, a plate fitting such opening and adapted to be secured to the machine bed, such plate having a cut out portion receiving the saw blade, and devices whereby to control the tilting of the table as the latter is turned on its vertical pivot, substantially as and for the purposes set forth.

8. In an apparatus substantially as described, the combination with a table having a transversely tilting or rocking and vertically pivoted motion, of the guide devices movable longitudinally with respect to said table and provided with reversely disposed cams engaging and controlling the tilting of said table, such cams being adjustably supported whereby they may be set to control the table differently in different adjustments, substantially as set forth.

9. In an apparatus substantially as described, a guide device comprising a frame, opposite cam bars, pivoted centrally and devices at the ends thereof whereby to secure the said cam bars in different adjustments combined with a transversely tilting or rocking table arranged within said frame and provided at opposite sides with portions for engagement by the cam bars, the cam bars being movable with respect to the table substantially as set forth.

10. In an apparatus substantially as described, the combination of the transversely tilting or rocking and vertically pivoted table, guide devices by which to control the tilting of such table, the back rests for the rear end of the timber being sawed, such back rest and table being provided at their meeting edges with recessed and interlapping portions whereby the timber may in operation be moved past the saw, all substantially as and for the purposes set forth.

11. An apparatus substantially as described, comprising a transversely tilting or rocking table and a sliding frame moving longitudinally with respect to such table carrying inclined reversely disposed pivoted cams forming guides engaging such table whereby to control the tilting thereof, substantially as set forth.

12. An apparatus substantially as described, comprising a transversely tilting or rocking table and a vertically pivoted quadrangular plate and support on which said table is mounted and oppositely inclined cams mounted in a frame moving longitudinally with respect to the table and engaging the sides of said quadrangular plate, whereby the guide device may be maintained in a parallel line lengthwise with the table, as the latter is swung upon the vertical axis of the quadrangular plate, substantially as and for the purposes set forth.

13. An apparatus substantially as described, comprising a transversely tilting or rocking table, a vertically pivoted quadrangular plate carrying an upright support on which said table is mounted, said pivoted quadrangular plate fitting between the longitudinally sliding frame which carries the inclined reversely disposed cams, which engage the table whereby to control the tilting thereof as the latter is turned on its vertical pivot, substantially as and for the purposes set forth.

14. In an apparatus substantially as described, the combination of a transversely tilting and vertically pivoted table, having a timber rest tilting simultaneously therewith, said timber rest having at its edge meeting with the table recessed interlapping portions; with a guide device consisting of longitudinally sliding frame carrying inclined reversely disposed pivoted cams engaging the table so as to control the tilting thereof as the latter is turned on its vertical pivot all substantially as and for the purpose set forth.

HERMAN D. HINTERNESCH.

Witnesses:
S. E. PENNING,
GEO. H. WINCHESTER.